Figures 1, 2:
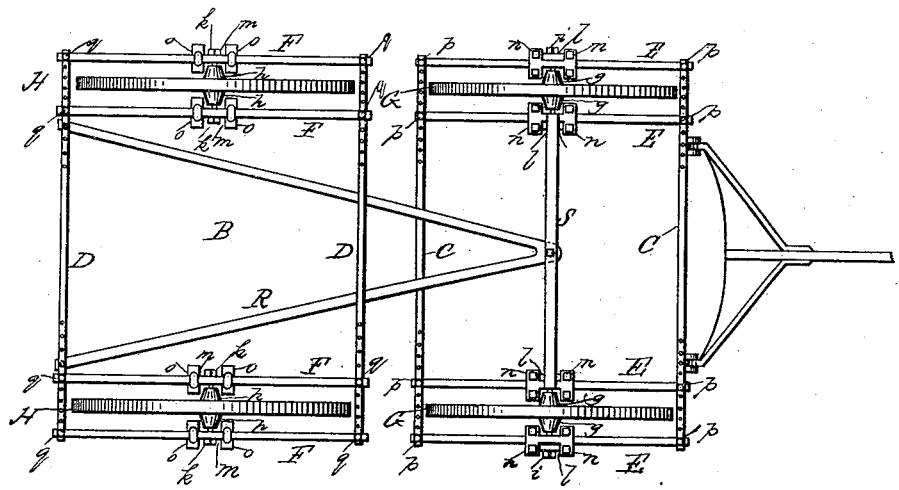

(No Model.)

J. T. CORDERY.
RUNNING GEAR FOR VEHICLES.

No. 329,817. Patented Nov. 3, 1885.

Witnesses
William H. Powell
H. A. Connolly

Inventor
John T. Cordery,
By Connolly Bros.,
Attorneys

UNITED STATES PATENT OFFICE.

JOHN T. CORDERY, OF ABSECON, NEW JERSEY.

RUNNING-GEAR FOR VEHICLES.

SPECIFICATION forming part of Letters Patent No. 329,817, dated November 3, 1885.

Application filed March 14, 1885. Serial No. 158,846. (No model.)

*To all whom it may concern:*

Be it known that I, JOHN T. CORDERY, a citizen of the United States, residing at Absecon, in the county of Atlantic and State of New Jersey, have invented certain new and useful Improvements in Running-Gear for Vehicles; and I do hereby declare the following to be a full, clear, and exact description of the invention, reference being had to the accompanying drawings, which form part of this specification, in which—

Figure 1 is a plan, and Fig. 2 a side elevation.

My invention has for its object to dispense with axles in vehicles, and to provide a construction which will permit the wheels to be brought nearer together or placed farther apart, so as to lessen or increase the "tread" of the same, and also to vary the distance between the front wheels and hind wheels, and to adjust one wheel with reference to another.

My invention consists in the peculiar construction of the adjustable frames composing the front and rear portions of the running-gear, and in the combination with said front and rear frames of the supporting-wheels, substantially as hereinafter fully described.

Referring to the accompanying drawings, A designates the front frame, and B the rear frame, of the running-gear. Said frames each consist of two cross-bars, C and D, and four side bars, E and F. Between the side bars are located the wheels G and H, with hubs $g$ and $h$, having bearings by means of center screws $i$ and $k$, in boxes $l$ and $m$. The screws $i$ and $k$ pass each through its box, and their points enter bushings in the hubs of the wheels, thus forming, in effect, journals for the latter. These boxes are secured by adjustable screw-clips $n$ and $o$ to the side bars, E and F. By these means the wheels can be fitted so tightly as not to rattle, and yet run smoothly. They can also be separately moved forward and backward, and raised and lowered, as circumstances or adjustment may require. The side bars and cross-bars are fastened to each other at their points of contact or intersection by screws $p$ $q$, and various holes for these screws should be provided, so that the width and length of the frames A and B may be varied. The front frame is connected to the rear frame by a perch or reach, R, secured to the rear bar, D, and to a bar, S, on the forward frame, which is designed to support the front spring or springs.

The perch R should be in a plane above the bars of the front frame, and in a plane below the bars of the rear frame; or this arrangement may be reversed, and this perch may have a series of adjusting-holes for the screws or fastening devices which connect it to the bars D and S, so that the frames may be brought nearer together or farther apart to lessen or increase the length of the running-gear or the distance between the front wheels and the rear wheels.

What I claim as my invention is as follows:

1. In running-gear for vehicles, the combination, with parallel side bars, of boxes fastened thereto, wheels located between said boxes, and center screws which pass through said boxes and enter the hubs of said wheels, substantially as shown and described.

2. In running-gears for vehicles, frames A B, composed of cross-bars C D, and parallel side bars, E F, between which the supporting-wheels are located, said cross and side bars being adjustable relatively to each other to enable the distance between said wheels to be varied, substantially as shown and described.

3. In running-gear for vehicles, the combination, with the supporting-wheels and their frames, of boxes for the journals of said wheels, said boxes being adjustable on said frames, substantially as shown and described.

In testimony that I claim the foregoing I have hereunto set my hand this 3d day of March, 1885.

JOHN T. CORDERY.

Witnesses:
A. S. DOUGHTY,
JOHN H. DOUGHTY.